United States Patent
Majors

(10) Patent No.: US 9,832,929 B1
(45) Date of Patent: Dec. 5, 2017

(54) HARVESTING HEAD AND MACHINE FOR MECHANICALLY HARVESTING OLIVES, GRAPES AND THE LIKE

(71) Applicant: William Majors, Kingsburg, CA (US)

(72) Inventor: William Majors, Kingsburg, CA (US)

( * ) Notice: Subject to any disclaimer, the term of this patent is extended or adjusted under 35 U.S.C. 154(b) by 0 days.

(21) Appl. No.: 14/071,888

(22) Filed: Nov. 5, 2013

(51) Int. Cl.
*A01D 46/26* (2006.01)
*A01D 46/28* (2006.01)

(52) U.S. Cl.
CPC ........... *A01D 46/264* (2013.01); *A01D 46/26* (2013.01); *A01D 46/28* (2013.01)

(58) Field of Classification Search
USPC ................................................ 56/328.1, 330
See application file for complete search history.

(56) References Cited

U.S. PATENT DOCUMENTS

| | | | | |
|---|---|---|---|---|
| 4,064,683 | A * | 12/1977 | Tennes et al. | 56/340.1 |
| 4,299,081 | A * | 11/1981 | Harris et al. | 56/330 |
| 4,769,979 | A * | 9/1988 | Merant | 56/330 |
| 5,642,610 | A * | 7/1997 | Dupon et al. | 56/340.1 |
| 7,500,342 | B2 * | 3/2009 | Merant et al. | 56/330 |
| 7,748,206 | B1 * | 7/2010 | Posselius et al. | 56/328.1 |
| 7,841,160 | B2 * | 11/2010 | Pellenc | A01D 46/28 56/328.1 |
| 2007/0012018 | A1 * | 1/2007 | Pellenc | A01D 46/28 56/328.1 |

FOREIGN PATENT DOCUMENTS

| | | | | |
|---|---|---|---|---|
| EP | 368773 | A1 * | 5/1990 | |
| EP | 0368773 | A1 * | 5/1990 | A01D 46/28 |
| EP | 826959 | A1 * | 3/1998 | |
| FR | 2638600 | A1 * | 5/1990 | |
| FR | 2666002 | A1 * | 2/1992 | |

* cited by examiner

*Primary Examiner* — Alicia Torres
(74) *Attorney, Agent, or Firm* — Richard A. Ryan

(57) ABSTRACT

A harvesting head utilized with or incorporated into a mechanical harvesting machine for harvesting crops. The harvesting head has a frame that attaches to a frame member of the harvesting machine. The frame defines a harvesting area sized to receive the canopy of a tree or vine and supports a picking assembly and a motion inducing mechanism. The picking assembly comprises a pair of sub-structures having a forward post member, rearward post member, a connecting member connecting the two posts and a plurality of curvilinear rods, which also interconnect the posts, that extend into the harvesting area. The motion inducing mechanism is connected to and pivots the posts of the picking assembly so as to rapidly move the rods forward and backward to engage the canopy and dislodge the crop therefrom. A conveying assembly conveys the crop to a bin.

20 Claims, 14 Drawing Sheets

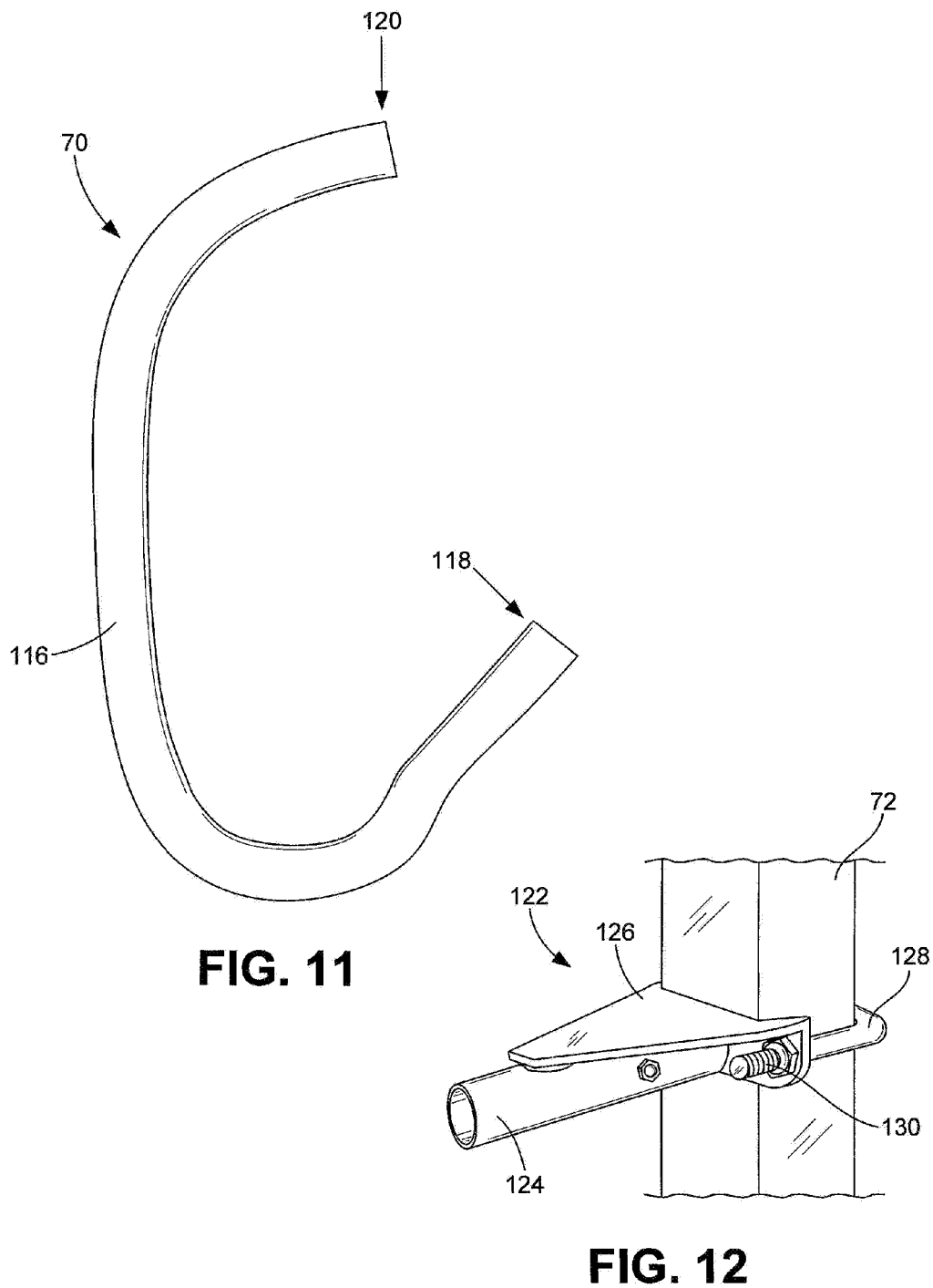

HARVESTING HEAD AND MACHINE FOR MECHANICALLY HARVESTING OLIVES, GRAPES AND THE LIKE

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses for use in harvesting crops that are grown in rows of trees or vines, such as olives, grapes, raisins and the like. More specifically, the present invention relates to such apparatuses that move or are moved along the ground and utilize a plurality of rods to apply an oscillating force to a tree or vine to separate the crop therefrom. Even more specifically, the present invention relates to such apparatuses that are configured to be removably supported by a harvesting machine or fixedly incorporated therein.

B. Background

The conventional methods of harvesting tree-borne crops such as olives and the like or harvesting grapes, raisins and other vine crops is typically a very labor intensive process requiring a significant number of laborers to separate the crop from the trees or vines and then collect the crop from the field or vineyard. These conventional methods generally require labor crews to walk through the field or vineyard and individually remove the fruit or clusters of the fruit from the tree or vine. As such, the economics of producing these types of crops is subject to and substantially driven by such factors as labor availability, ever increasing labor and material costs, and, with regard to dried fruit, unpredictable weather.

Tree-borne fruit such as olives and the like are typically grown in orchards comprising a plurality of generally parallel rows of trees. Grapes, raisins and other vine fruit are typically grown in vineyards comprising separate, generally parallel rows having a trellis system that runs along the row, producing rows of vines that stand approximately four to six feet high. To reduce the availability and cost issues of manually harvesting fruit such as olives, grapes and raisins, a number of mechanical harvesting machines have been developed to move along the row of trees or vines and separate the fruit from the trees and vines. Due to various limitations and problems, however, few of these harvesting machines are actually commercially available or in use by growers. As will be readily appreciated by persons skilled in the art, a successful mechanical harvesting machine for harvesting fruit from trees must be able to efficiently and effectively move to and about the orchard from which the fruit will be harvested, move from one tree to another tree and move from one row of trees to another row. The harvesting machine must be configured to harvest the fruit from substantially the entire tree, including the top, bottom and middle of the tree, in order to avoid having to hand pick much, if any, of the remaining fruit on the tree. The harvesting machine must also be configured to not damage the tree, including breakage of limbs and trunks, or the fruit, as applicable, that is removed from the tree. Most successful harvesting machines for picking fruit from trees are able to move along a row of trees and harvest fruit from each tree while stopping for only a short amount of time at the tree so as to limit the amount of time required for harvesting to as little as possible. With regard to grapes, raisins and other vine crops, a mechanical harvesting machine must be able to move along the row of vines, engage the vines and separate the grapes or raisins from substantially the entire vine without damaging the fruit, vine or trellis system. In one method of growing raisins, the grapes are placed on long sheets of paper to dry into raisins. For harvesting fruit from both trees and vines, the preferred mechanical harvesting machines are able to collect the fruit after it is separated from the tree or vine (so as to avoid the fruit from falling on the ground), move the fruit through the harvesting machine and deposit the fruit directly into a bin or other storage container.

One type of mechanical harvesting machine for harvesting fruit from trees is configured to grasp onto or otherwise engage the trunk of the tree and shake the tree to dislodge the fruit from the tree. The mechanism for shaking the tree is configured to impart a shaking movement to the tree for a sufficient amount of time that most, or at least a substantial amount, of the fruit will fall from the tree. Many of these machines have a canopy, netting or other device to capture the fruit as it falls from the tree to avoid having to pick the fruit up from the ground. In order for this type of harvester to be effective, however, the tree must be strong enough to be shaken without damage to the tree yet flexible enough to transmit the shaking motion at the trunk to the branches where the fruit is located and the fruit must be attached to the tree in a manner that facilitates the fruit being separated as a result of a reasonable amount of shaking. Although olive trees may be harvested in this manner, not all fruit trees can be harvested by shaking the tree (for instance, pomegranates and oranges are generally not suitable for harvesting by shaking). Many patents and other prior art harvesting mechanisms have been developed to improve the technology of these types of harvesters, primarily with regard to the mechanisms that grasp the tree trunk and the mechanisms which provide the shaking motion.

Another type of harvesting machine for harvesting fruit from trees has a frame which supports a plurality of flexible rods which extend into the tree and a mechanism for imparting an oscillation or other motion to the rods to cause the fruit to separate from the tree. In one configuration of this type of harvester, the flexible rods extend outwardly from a moveable support frame that is attached to and transported by the harvester so as to selectively direct the rods into and out of the tree branches to, respectively, dislodge the fruit from the tree and then allow the harvester to move to the next tree along the row of trees. An example of this type of harvester for use in harvesting olives is shown in European Patent Application EP 2119340 to Georgoulis. U.S. Pat. No. 3,485,025 to Bohannon describes a mechanical citrus fruit harvester having a harvesting head mounted on a support platform with a plurality of harvesting fingers projecting from the harvesting head that are vibrated vertically and horizontally to engage and remove fruit from within a tree. U.S. Pat. No. 5,666,795 to Wilkinson describes a mechanical harvesting machine having a plurality of outwardly extending picking arms carried on a driver bar that is moved toward and away from the tree so the picking arms selectively penetrate the tree canopy. A drive mechanism applies a generally cyclic motion to the individual picking arms to assist in dislodging the fruit from the tree. A recent mechanical citrus harvesting machine, available from Oxbo Corp., is a continuous travel canopy shaker that has a plurality of outward extending tines disposed in a generally circular pattern which are inserted into one side of the tree's canopy and then shaken to dislodge the fruit from the tree. A pair of the machines are moved along the open spaces on either side of a row of trees to remove fruit from trees in the row by rapidly shaking the tines inside the canopy. A number of workers, such as 25 to 30, follow behind the harvester to collect the fruit that is knocked onto the ground by the harvester.

Another type of harvesting machine, which in different configurations is utilized to harvest fruit from trees and/or vines, comprises a main support frame that straddles the tree or vines to define a harvesting area which receives the tree canopy or the vines, a moveable picking assembly having a plurality of flexible rods that are directed inward into the harvesting area and a motion inducing mechanism that is configured to impart motion, typically an oscillation or generally oscillating type of motion, to the flexible rods so as to separate the fruit from the tree or vine. Many of these types of mechanical harvesting machines also have a conveying assembly that is attached to and supported by the main support frame to receive the fruit that is separated from the tree or vine and transfer the fruit to a storage container, such as a bin. Some of these mechanical harvesting machines also have a canopy/vine engaging mechanism that moves the picking mechanism in and out of engagement with the canopy or vines to allow the machine to separate fruit and then move to the next tree or along the row of vines. An example of this type of mechanical harvesting machine is U.S. Pat. No. 4,959,950 to Burke, which describes a picking head suitable for use with a harvester that is configured to transport the picking head along a row of trees or vines. A similar apparatus is set forth in U.S. Pat. No. 5,067,314 to Burke, which describes a grape harvesting machine. Another example of this type of machine is set forth in U.S. Pat. No. 7,748,205 to Amaro, which describes a mechanical harvesting machine that is particularly adapted for harvesting fruit from pomegranate and orange trees.

Unfortunately, many of the prior art harvesting machines are either very expensive to build and maintain, have the potential to damage certain types or configurations of trees or vines and/or are not as effective as desired with regard to separating fruit from the tree or vine, particularly for certain type of trees or vines. What is needed, therefore, is an improved mechanical harvesting head for use with or as part of a mechanical harvesting machine that effectively separates fruit from a tree or vine, particularly with regard to olives, grapes and raisins, without damaging the tree, vine or fruit so the fruit can be harvested in a more efficient manner. A desirable harvesting head or harvesting machine is one that is beneficial for harvesting crops grown on trees or vines having crops that can be separated by imparting motion into the canopy of the tree or into the vines. When configured as a harvesting head, preferably the harvesting head can be easily installed onto and transported by commercially available harvesting machines. The improved harvesting head or machine should allow harvesting of the crop to take place as quickly and efficiently as possible with a low number of laborers and less wasted time and effort so as to facilitate the commercial cultivation of the fruit by reducing the overall cost of such harvesting. The harvesting head or machine should be able to harvest virtually all or the vast majority of the crop off of the tree or vine in order to reduce the need for follow-up hand harvesting.

SUMMARY OF THE INVENTION

The harvesting head for mechanically harvesting fruit such as olives, grapes and the like of the present invention provides the benefits and solves the problems identified above. That is to say, the present invention discloses a new harvesting head that can be moveably supported by a harvesting machine or be incorporated into a harvesting machine that is particularly adapted for harvesting fruit from rows of trees or vines. More specifically, the improved harvesting head and machine of the present invention allows the fruit to be quickly harvested with only a few workers and much less wasted time and effort, thereby facilitating the improved commercial cultivation of such fruit. The harvesting head, when utilized with or incorporated into a harvesting machine, is configured to move along a row of trees or vines to harvest fruit from the trees while only stopping for a very short time at each tree or from vines without stopping. The harvesting head of the present invention is configured with a frame that supports a specially configured picking assembly having a plurality of curved rods and motion inducing mechanism that oscillates the rods to separate the fruit from the tree or vine without damaging the tree or vine and without damage to the fruit. The picking assembly is moveably disposed in an open harvesting area, which is defined by the support frame of the harvesting head, that is sized to receive the canopy of the tree or vine. In use, the harvesting head is attached to a harvesting machine, if not fixedly incorporated therewith, and the harvesting machine is either driven or moved from one tree to another along a row of such trees or along a row of vines, to place the picking assembly in engagement with the canopy or vines and then the motion inducing mechanism is operated to oscillate the rods to separate the fruit from the tree or vines. Typically, the harvesting machine associated with the harvesting head of the present invention will include a conveying assembly that conveys the fruit to a bin or other container.

In one embodiment of the present invention, in which the improved harvesting head is configured to be removably attached to a frame member of a harvesting machine, the harvesting head generally comprises a main support frame configured to be supported by the harvesting machine so as to move therewith, a motion inducing mechanism support by the main support frame and a picking assembly pivotally supported by the main support frame. The main support frame has a plurality of frame members that are structured and arranged so as to substantially straddle the tree, vine or other plant as the harvesting machine moves along the row of such plants. The main support frame has a front end, a back end, a top side, a bottom side and a pair of opposing sides that collectively define a harvesting area therebetween. The harvesting area is sized and configured to receive the canopy of the plant therein when the main support frame is positioned so as to straddle the plant. The motion inducing mechanism has a mounting block that supports a shaft on one or more bearings and a motor operatively connected to the shaft. The motion inducing mechanism also has one or more offset center bearings and one or more weight members on the shaft. The motion inducing mechanism is structured and arranged to rapidly induce alternating forwardly and rearwardly directed motion, which is utilized by the picking assembly to separate the crop on the plant from the plant. The picking assembly is structured and arranged to engage the canopy of the plant when the plant is in the harvesting area so as to separate the crop from the plant. The picking assembly generally comprises a pair of sub-structures that are disposed on each of the opposing sides of the main support frame and are positioned so as to be at least partially disposed in the harvesting area. Each of the sub-structures has a forward post member disposed towards the front end of the main support frame and pivotally connected thereto, a rearward post member disposed towards the back end of the main support frame and pivotally connected thereto, a plurality of curvilinear rods interconnecting the forward post member and the rearward post member, a first connecting member that connects the motion inducing mechanism to one of the forward or rearward post member so as to pivot each of the sub-structures in response to the alternating forwardly and rearwardly directed motion and a second connecting member that is sized and configured to interconnect the forward post member and the rearward post member so as to pivot the forward post member and the rearward post member substantially together. Each of the rods are sized and configured with a rod body that extends into the harvesting area to engage the canopy of the plant when the plant is in the harvesting area.

In another embodiment of the present invention, the harvesting head is fixedly incorporated into or integrally constructed with a harvesting machine. In this embodiment, the harvesting machine comprises a frame having one or more frame members, one or more wheels rotatably connected to the frame to allow the harvesting machine to move through a growing area having a row of the plants to be harvested, the harvesting head described above that is attached, typically fixedly attached, to the frame of the harvesting machine and a conveying assembly that is structured and arranged to receive and convey the crop separated from the plant by the picking assembly of the harvesting head. Typically, the dislodged crop is conveyed by the conveying assembly to a bin or other storage unit associated with the harvesting machine, such as being carried or pulled thereby, or which is pulled substantially alongside the harvesting machine.

Accordingly, the primary objective of the present invention is to provide a harvesting head that has the benefits described above and which overcomes the limitations and problems associated with currently available harvesting heads and harvesting machines.

It is a primary objective of the present invention to provide a harvesting head that can be utilized with or incorporated into a harvesting machine so as to be able to mechanically harvest certain crops in order to significantly reduce the labor required to harvest such crops, thereby solving problems related to the supply and cost of such labor.

It is also a primary objective of the present invention to provide a harvesting head for use with or in a harvesting machine that is configured to move along a row of trees to harvest fruit from the trees while only stopping for a very short time at each tree or along a row of vines without stopping.

It is also a primary objective of the present invention to provide a harvesting head or harvesting machine that imparts a snap-like rapid oscillation motion to a plurality of rods that sufficiently extend into the canopy of a tree or into the vines to separate fruit from the tree or vines.

It is an important objective of the present invention to provide a harvesting head that comprises a frame defining a harvesting area that receives the canopy of the tree or the vines and which supports a specially configured picking assembly having a plurality of curved rods extending into the harvesting area and a motion inducing mechanism that oscillates the rods against the canopy or vines to separate the fruit from the tree or vine without damaging the tree or vine and the fruit.

It is also an important objective of the present invention to provide a harvesting head for use with or incorporated into a harvesting machine that does not require the shaking of the tree trunk or the individual grasping and removing of the fruit in order to harvest the fruit.

Another important objective of the present invention is to provide a harvesting head for use with or which can be incorporated into a harvesting machine that can be manufactured and maintained in a cost effective manner.

The above and other aspects of the present invention are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 11 is a top view of one of the rods of the picking assembly of FIG. 10 shown separate from the picking assembly;

FIG. 12 is a side perspective view of one of the rod attachment mechanisms shown attached to one of the support posts of the picking assembly of FIG. 10;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are generally directed to a harvesting head as an apparatus that is separate from a harvesting machine to harvest fruit from a tree and show certain shapes and configurations and describe certain materials for the various components of the harvesting head, those skilled in the art will understand that this is merely for purposes of simplifying this disclosure and that the present invention is not so limited. For instance, the harvesting head can be fixedly incorporated into the harvesting machine as an integral unit and it can be utilized to harvest fruit from vines and other crops.

Figure 1:
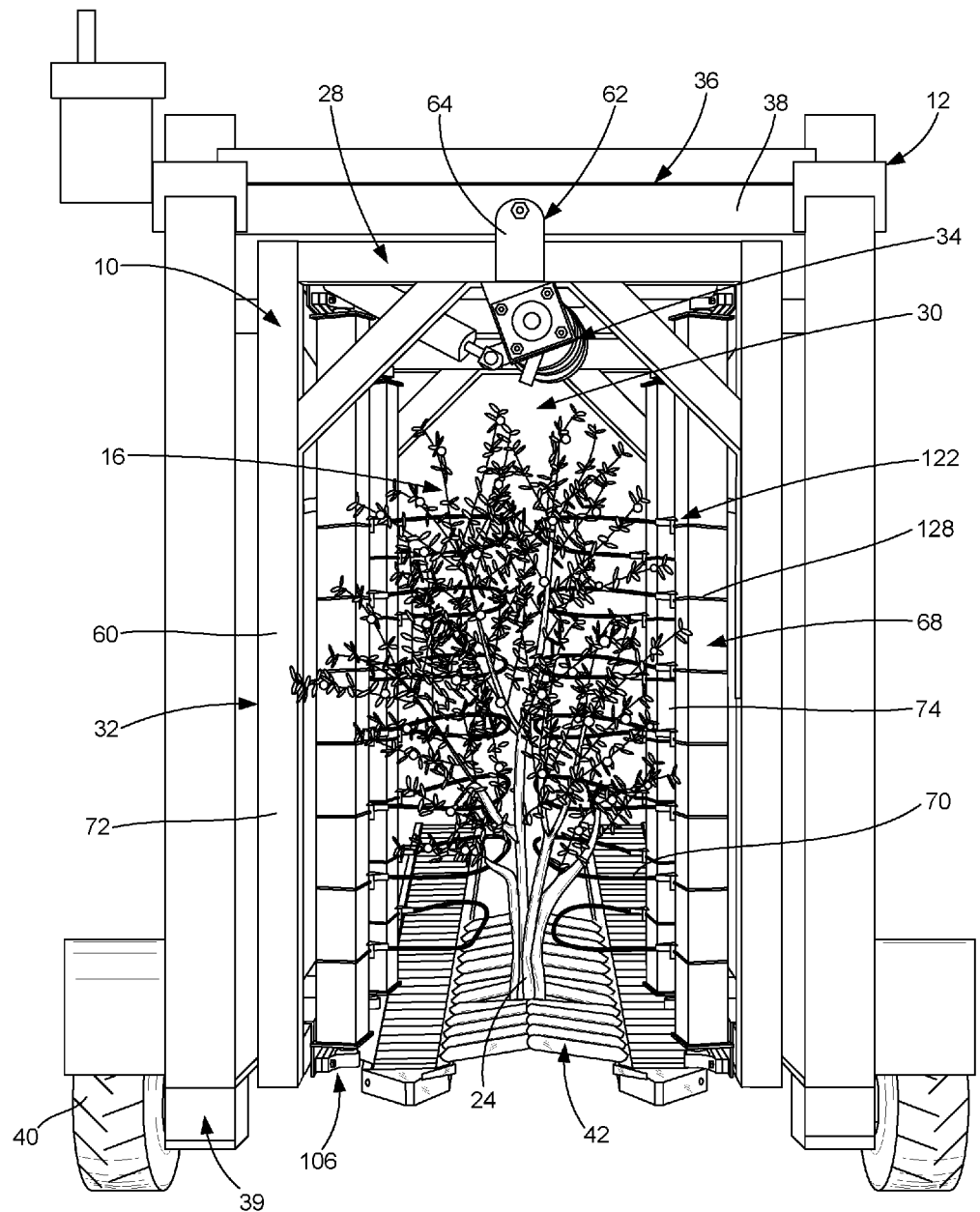
FIG. 1 is a front view of a harvesting head configured according to a preferred embodiment of the present invention shown mounted to and in use with a harvesting machine while engaging the canopy of a tree.
Figure 2:
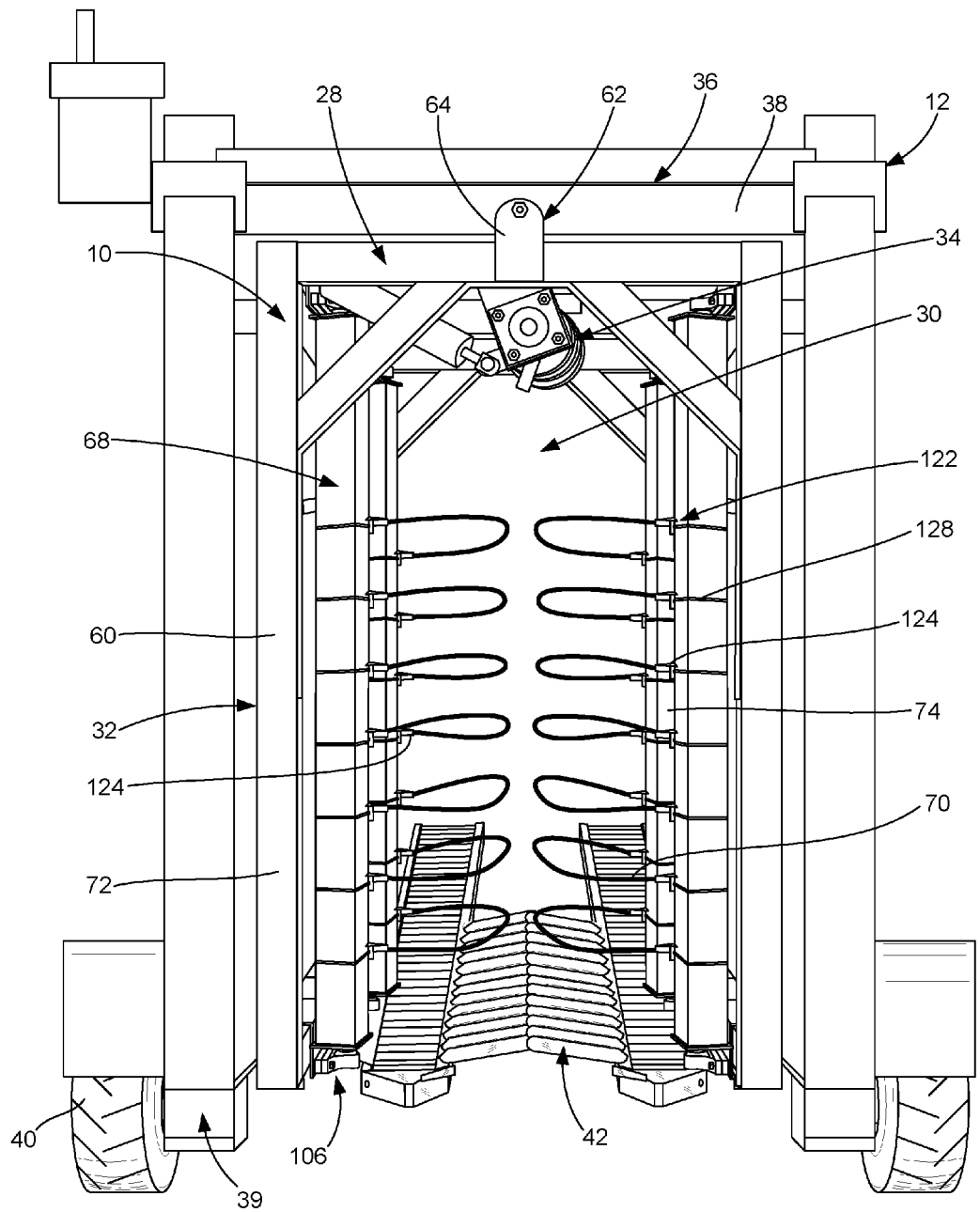
FIG. 2 is a front view of the harvesting head and harvesting machine of FIG. 1 shown without the tree.

A harvesting head that is configured pursuant to various embodiments of the present invention is shown generally as 10 in FIGS. 1-4. As described in more detail below and shown in FIGS. 1 and 2, the harvesting head 10 of the present invention is configured for use with a mechanical harvesting machine 12 and is utilized to mechanically harvest crops grown on trees or vines, such as the fruit 14 on the tree 16 shown in FIGS. 1 and 15. In the embodiments shown in the figures, the harvesting head 10 is structured and arranged to be removably attached to and moveably supported by the mechanical harvesting machine 12. Being removably attached allows the user to utilize the harvesting head 10 with the mechanical harvesting machine 12 when he or she is harvesting certain types of crops and then remove the harvesting head 10 from the mechanical harvesting machine so that the base mechanical harvesting machine 12 can be utilized with other types of harvesting heads to harvest crops or with other equipment for other purposes. As will be readily appreciated by persons skilled in the art, alternatively the harvesting head 10 of the present invention can be manufactured as an integral component of the harvesting machine 12 or the harvesting head 10 may be fixedly attached to the harvesting machine 12 so as to be substantially integral with the mechanical harvesting machine 12. As will also be readily appreciated by persons who are skilled in the art, the mechanical harvesting machine 12 that is shown in FIGS. 1 and 2 is merely representative of a variety of different types of mechanical harvesting machines which the harvesting head 10 of the present invention may be attached to or otherwise utilized with to harvest crop 14 from trees/vines 16. As will be further understood and appreciated by persons skilled in the art, the mechanical harvesting machine 12 that is utilized to support and carry the harvesting head 10 may be of the type that is self-propelled or, as shown in FIG. 16, of the type that is towed behind a tractor, such as first tractor 18, or other equipment which is suitable for towing the harvesting machine 12.

Figure 15:
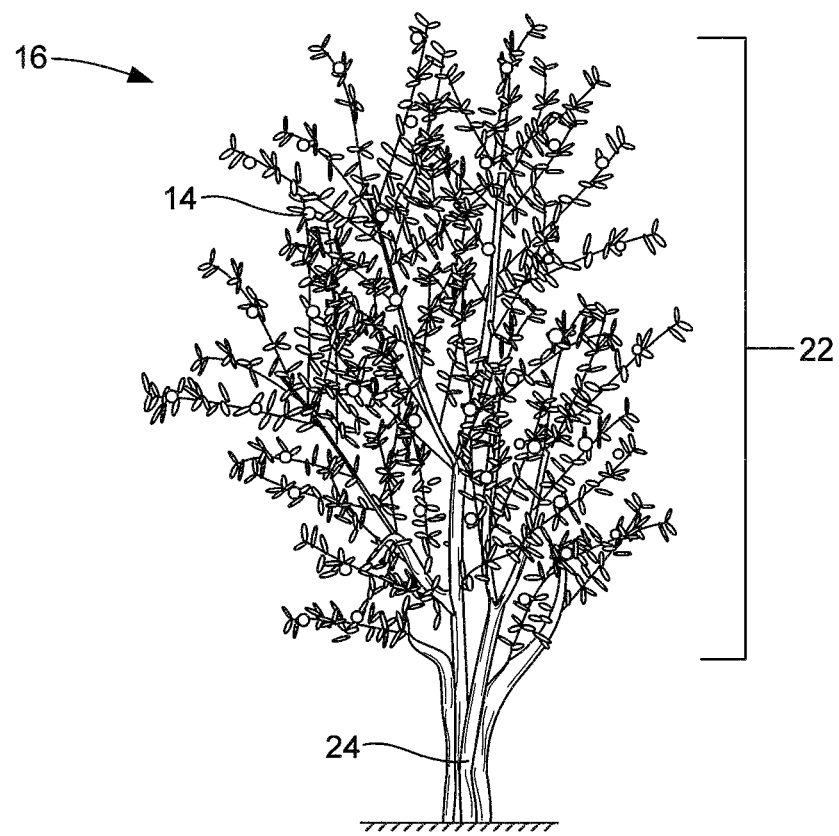
FIG. 15 is a front view of a prior art tree utilized for reference with the harvesting head of the present invention.
Figure 16:
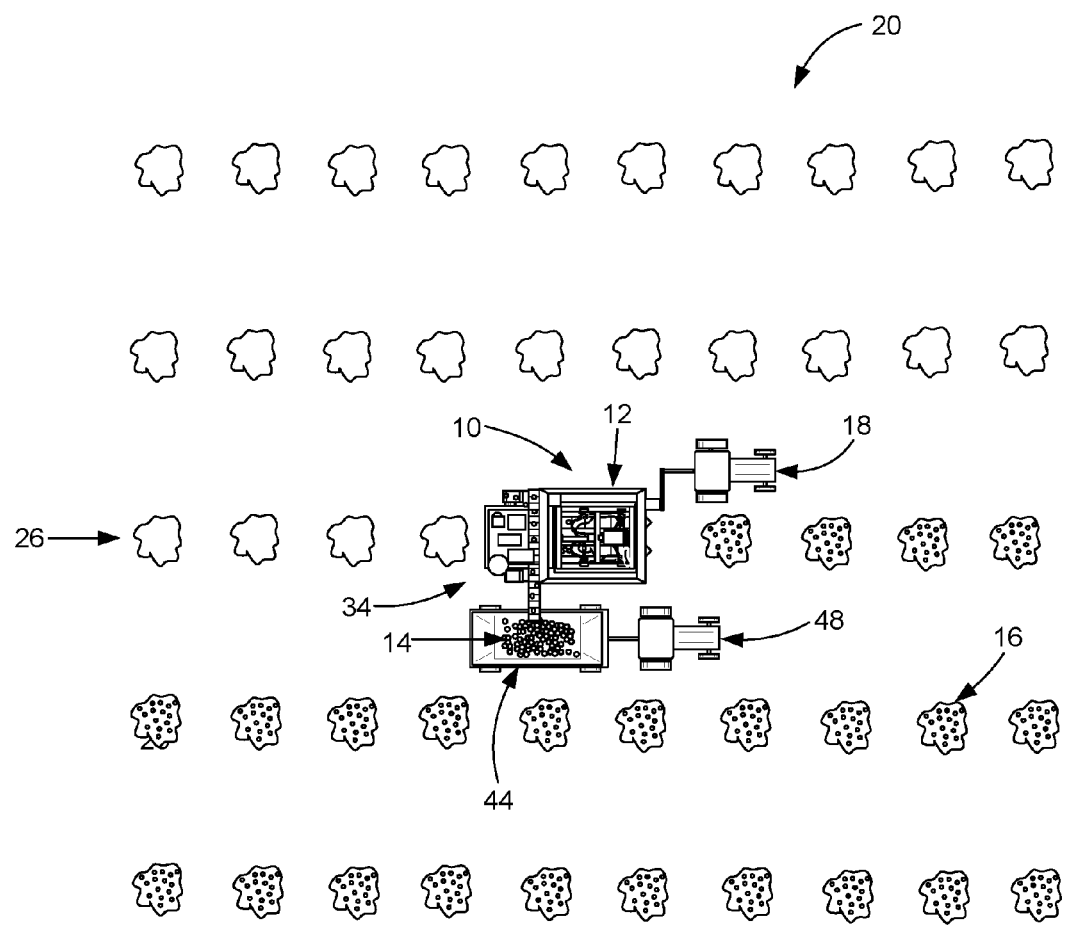
FIG. 16 is a top plan view of a field having trees with fruit thereon in a plurality of rows with a mechanical harvesting machine having the harvesting head of the present invention being towed by a first tractor while harvesting fruit from a tree and the conveying assembly disposing picked fruit into a trailer-mounted bin that is being towed by a second tractor.

As stated above, the harvesting head 10 of the present invention is structured and arranged to separate the crop 14 from the plant 16, such as a tree or vine, by moving or being moved through a growing area 20, such as an orchard, field or vineyard, and mechanically engaging the canopy 22 of the plant 16 having a trunk 24 that supports the plant 16 in a generally upright position, as shown in FIGS. 1, 2, 15 and 16. The figures and description included herewith show and describe use of the harvesting head 10 to harvest olives (as the crop 14) from an olive tree (as the plant 16) in an orchard (as the growing area 20) having a plurality of rows 26 of plants 16, as shown in FIGS. 1, 15 and 16. As will be appreciated by those skilled in the art, however, the harvesting head 10 of the present invention can be utilized with a wide variety of different crops that may be grown on trees or vines, including grapes or raisins, that may be grown in an orchard, vineyard or field. As such, use of the harvesting head 10 of the present invention to harvest olives from an olive tree, as the crop 14 and plant 16 respectively, is only included herewith for exemplary purposes and to generally simplify the disclosure of the present invention. Use of the term "crop" (shown as 14) includes any fruit or other crop that may be beneficially harvested with the harvesting head 10 of the present invention and, as such, the terms "crop" and "fruit" are utilized interchangeably herein. Likewise, use of the terms "tree" and "field" (respectively shown as 16 and 20) are also used to refer to any plant 16, including trees and vines, that grows the crop 14 and to refer to the orchard, vineyard, field or other growing area 20 in which the tree, vine or other plant 16 is located. As such the terms "plant", "tree" and "vine" are utilized interchangeably herein, the terms "growing area", "orchard", "vineyard" and "field" are also used interchangeably herein. As shown in FIG. 16, the harvesting machine 12 moves from tree to tree to separate the crop 14 from the tree 16. Although the row 26 shown in FIG. 16 necessarily show the trees 16 in spaced apart relation to each other for proper growth spacing of each tree 16 in an orchard, the row 26 may be a continuous or substantially continuous positioning of plants, such as is done for vines 16 in a vineyard 20, to allow the mechanical harvesting machine 12, having the harvesting head 10, to continuously move along the row 26 of vines 16 to remove the grapes, raisins or other crops 14 from the vines 16. Often the various plants 16 from which the crop 14 is to be harvested with harvesting head 10 will be specially trimmed or otherwise sculptured in a manner that makes harvesting the crop 14 with harvesting head 10 easier, faster and overall generally more efficient.

As shown in FIGS. 1 and 16, the harvesting head 10 is configured to be attached to and supported by the harvesting machine 10 so as to straddle the tree 16 as it moves along the row 26 of trees 16. The harvesting head 10 of the present invention generally comprises an inverted u-shaped main support frame 28 that is attached to and supported by the mechanical harvesting machine 12 and configured to substantially straddle the tree 16, an open harvesting area 30 defined by the support frame 28, a picking assembly 32 that is moveably connected to and supported by the main support frame 28 and specially structured and arranged to engage the canopy 22 of tree 16 in the harvesting area 32 and a motion inducing mechanism 34 that is connected to the picking assembly 32 and configured to selectively oscillate the picking assembly 32 to separate the fruit 14 from the tree 16, as best shown in FIGS. 1-6. The mechanical harvesting machine 12 generally comprises a frame 36 having a plurality of frame members 38 and a chassis 39 having a plurality of wheels 40 that are rotatably attached thereto which support and allow the harvesting machine 12 to move, whether by being pulled (such as by the first tractor 18) or being self-propelled, through the growing area 20. Typically, the harvesting machine 12 also has a conveying assembly 42 that is configured to receive the crop 14 after it is separated from the plant 16 and convey the dislodged crop 14 to a storage container, such as the bin 44 shown in FIG. 16, being pulled by a second tractor 46 in a position substantially parallel to the harvesting machine 12. Alternatively, the bin 44 may be incorporated within the harvesting machine 10, towed or carried by the harvesting machine 10 or otherwise be transported in a position to receive the crop 14 from the conveying assembly 42. As set forth in more detail below, the harvesting head 10 connects, removably or fixedly, to at least one of the frame members 38 of the harvesting machine 12, as best shown in FIGS. 1 and 2, so the harvesting head 10 can be moved along one of the rows 26 of the plants 16, whether they are trees or vines, to engage one of the plants 16 and separate the crop 14 therefrom.

Figure 3:
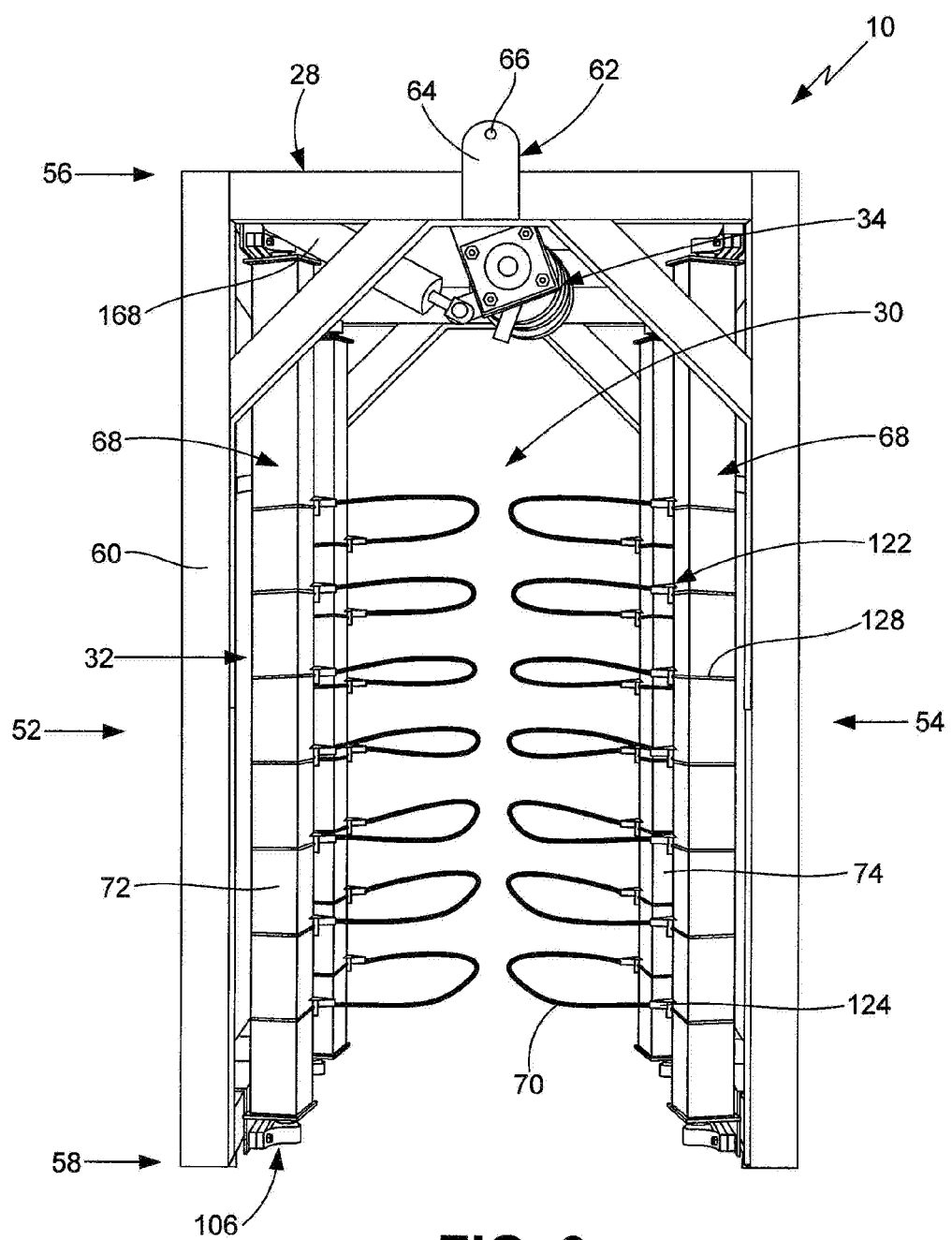
FIG. 3 is a front view of the harvesting head of FIG. 2 shown separate from the harvesting machine.
Figure 4:
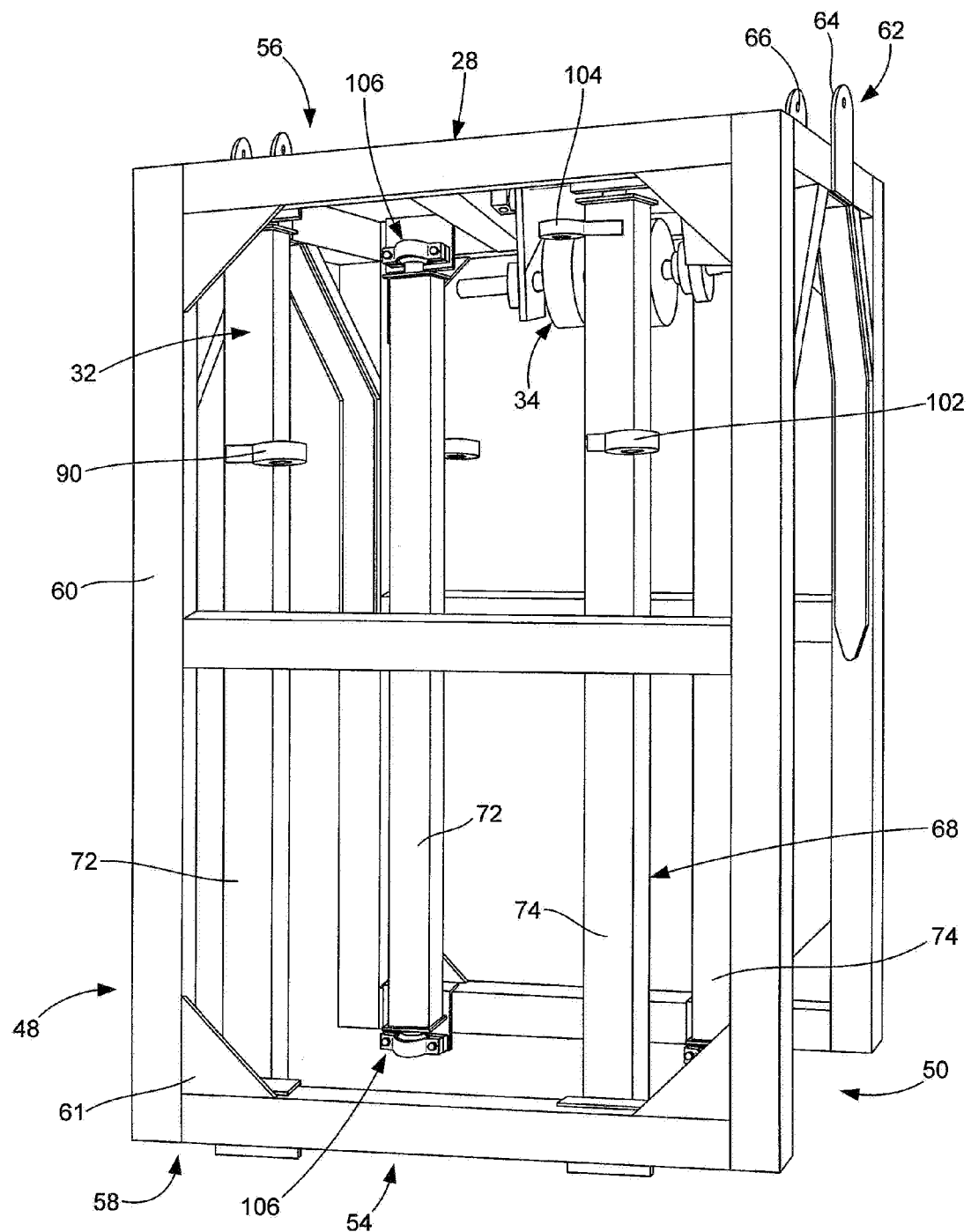
FIG. 4 is a back perspective view of the harvesting head of FIG. 3 shown without the flexible rods, rod mounts and associated components thereof to better show the frame, support posts and motion inducing mechanism of the present invention.

As best shown in FIGS. 3 and 4, harvesting head 10 has a front end 48, a back end 50, a left or first side 52 (viewed from in front of harvesting head 10 where the tree 16 is received), a right or second side 54, a top side 56 and a bottom side 58, which are utilized in the description below to identify the position of the various components of harvesting head 10. As will be readily apparent to persons skilled in the art, the main support frame 28 is substantially open at the center thereof between the first side 52 and the second side 54 through the harvesting head 10 from the front end 48 to back end 50 thereof so the harvesting head 10 may straddle a tree 16 as it moves along the row 26 of trees 16. The main support frame 28 comprises a plurality of frame members 60 that, as set forth above, are structured and arranged in a generally inverted u-shaped configuration that forms the substantially open harvesting area 30 therein that is sized to receive the tree or other plant 14 which is to be harvested by the harvesting head 10 of the present invention, as shown in FIG. 1. The frame members 60 are arranged such that the entrance into and the exit from the harvesting area 30 are open, providing a substantially open front end 48 and a substantially open back end 50, as best shown in FIGS. 3 and 4, so the tree 14 will easily pass into the harvesting area 30 where the canopy 22 can be acted upon by the picking assembly 32 to separate the crop 14 from the plant 16. As set forth in more detail below, support frame 28 moveably supports both the picking assembly 32 and motion inducing mechanism 34 in a manner that allows the motion inducing mechanism 34 to oscillate various components of the picking assembly 32 to separate the crop 14 from the plant 16 being harvested.

As with other harvesting machines and components thereof, the various frame members 60 of the main support frame 28 are preferably made out of steel or other metal that is sized and configured to safely support the various components of harvesting machine 10. In a preferred configuration, the frame members 60 are painted, coated or otherwise treated to reduce the likelihood of corrosion and are joined together utilizing connectors and connecting techniques, such as welding or the like, that are appropriate for the materials utilized for the frame members 60 forming the main support frame 28. If desired, one or more bracing members 61 may be utilized at the corners of the support frame 28, such as shown on the sides 52/54 in FIGS. 4 and 6.

Figure 5:
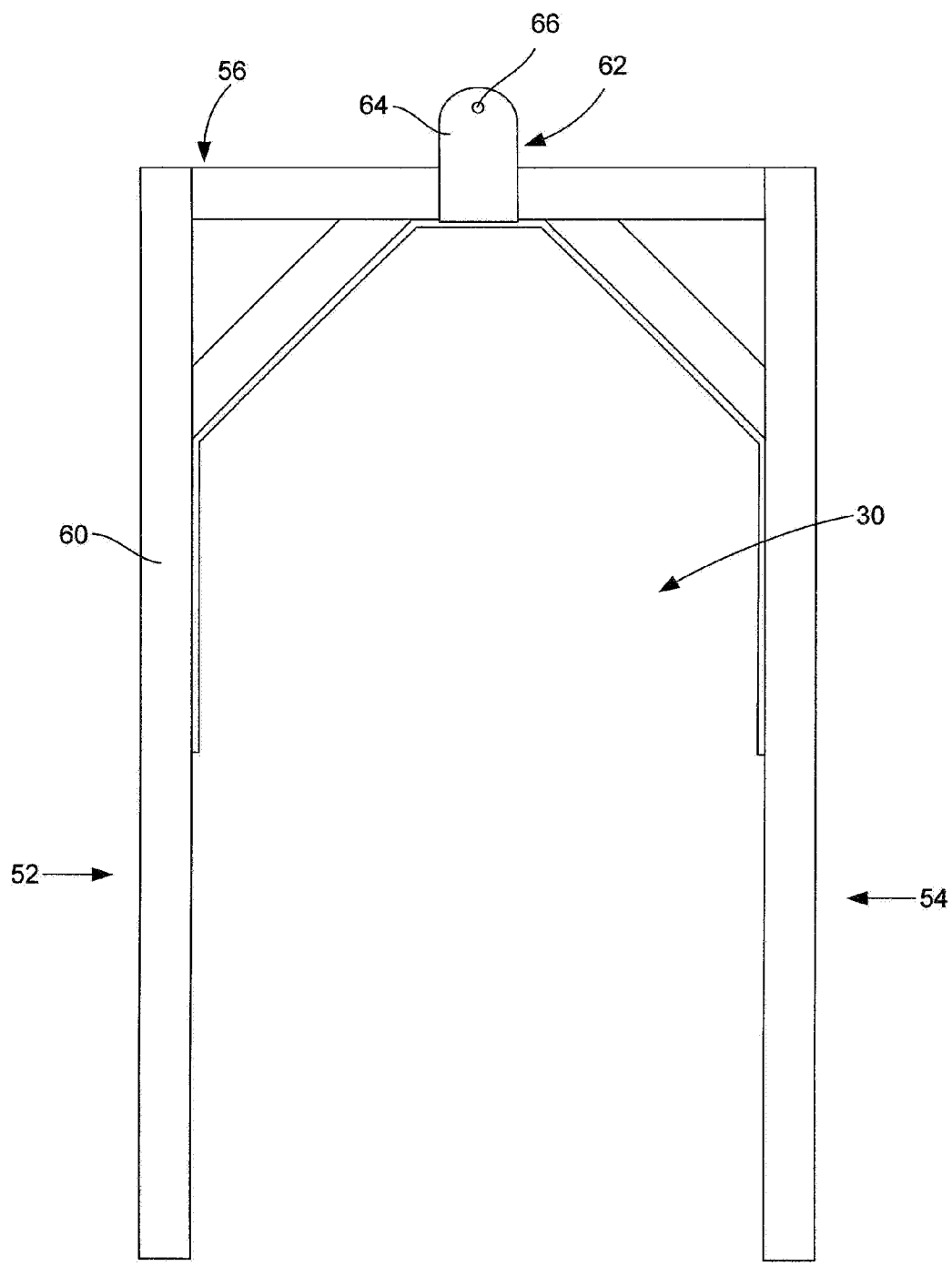
FIG. 5 is a front view of the support frame of the harvesting head of FIG. 4.
Figure 6:
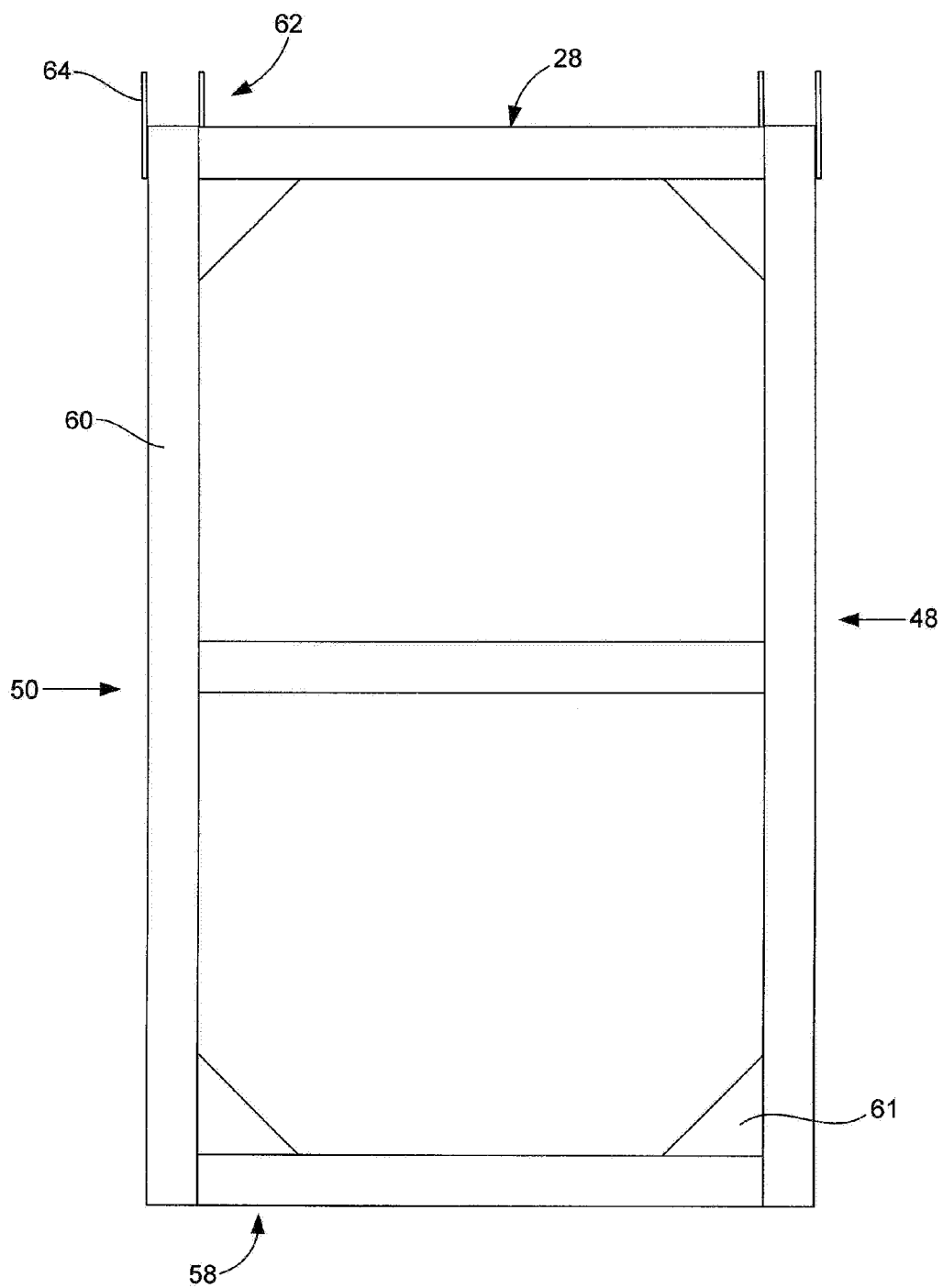
FIG. 6 is a side view of the support frame of the harvesting head of FIG. 4.

Attached to or integral with one or more frame members 60 of support frame 28 is a connecting mechanism 62 that is configured to connect the support frame 28 to one or more frame members 38 of the frame 36 of harvesting machine 12 so the harvesting head 10 will be supported and transported with the harvesting machine 12. In one embodiment, the connecting mechanism 62 comprises a pair of connecting plates 64 that are welded or otherwise fixedly connected at each of the front end 48 and back end 50 of the support frame 28, as best shown in FIGS. 4-6. The pair of connecting plates 64 are positioned on either side of a frame member 60 that extends left/right across the front end 48 and back end 50 at the top side 56 of the support frame 28. In the embodiment where the harvesting head 10 is removably attached to the frame 36 of the harvesting machine 12, each connecting plate 64 has an aperture 66, best shown in FIG. 5, that is sized and positioned with a corresponding aperture (not shown) in the frame member 38 of the frame 36 of the harvesting machine 12 for a bolt or other connecting element to pass through and join the harvesting head 10 to the harvesting machine 12. In other embodiments, the connecting plates 64 may be welded or otherwise fixedly joined to the frame 36 of the harvesting machine 12.

As set forth above, the picking assembly 32 is structured and arranged to engage the canopy 22 of plant 16 and, when oscillated by the motion inducing mechanism 34, separate the crop 14 from the plant 16 so that the crop 14 may be removed from the growing area 20, typically by conveying the dislodged crop 14 to the bin 44 via the conveying assembly 42. In the embodiment shown in the figures, the picking assembly 32 comprises a pair of picking sub-structures 68, with one positioned on each of the sides 48/50 of the main support frame 28. Each picking sub-structure 68 primarily comprises a plurality of rods 70, a forward post member 72 pivotally connected to support frame 28 at or toward the front end 48 thereof, a rearward post member 74 pivotally connected to support frame 28 at or toward the back end 50 thereof, a first connecting member 76 and a second connecting member 78, as best shown in FIGS. 2-4. The rods 70 are sized and configured to extend between and interconnect the forward post member 72 and rearward post member 74 of one of the sub-structures 68 and to extend somewhat inwardly into the harvesting area 30 so as to engage the canopy 20 of the plant 16 when the plant 16 is in the harvesting area 30, as shown in FIG. 1, to dislodge the crop 14 from the plant 16. The first connecting member 76 connects the motion inducing mechanism 34 to picking sub-structure 68 in order to transfer the motion developed by the motion inducing mechanism 34 to the sub-structure 68. In the embodiments shown in the figures, the first connecting member 76 connects the motion inducing mechanism 34 to the rearward post member 74. The second connecting member 78 interconnects the forward 72 and rearward 74 post members of sub-structure 68 so the two members 72/74 will move together to oscillate the rods 70 and dislodge the crop 14 from the plant 16.

Figure 8:
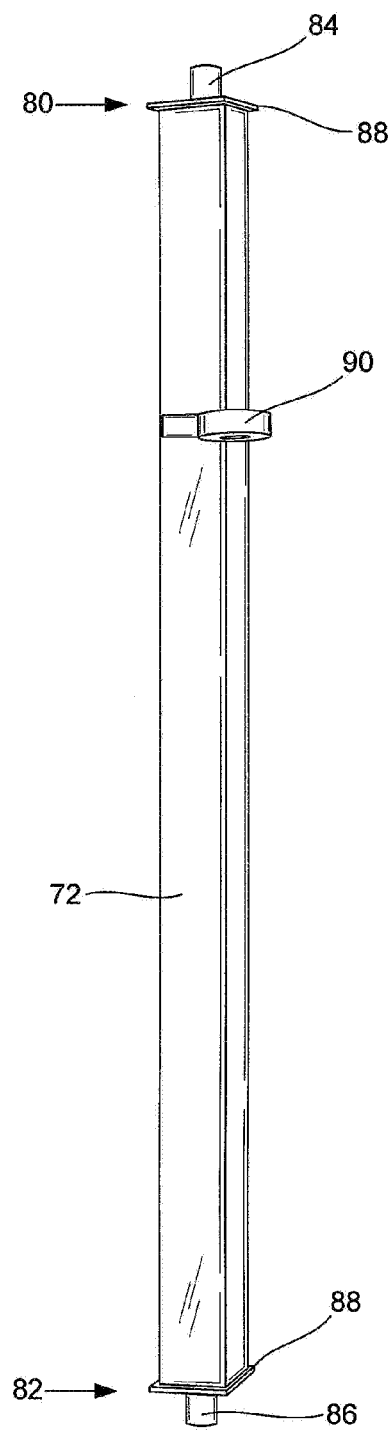
FIG. 8 is a side perspective view of one of the forward support posts of FIG. 4.
Figure 10:
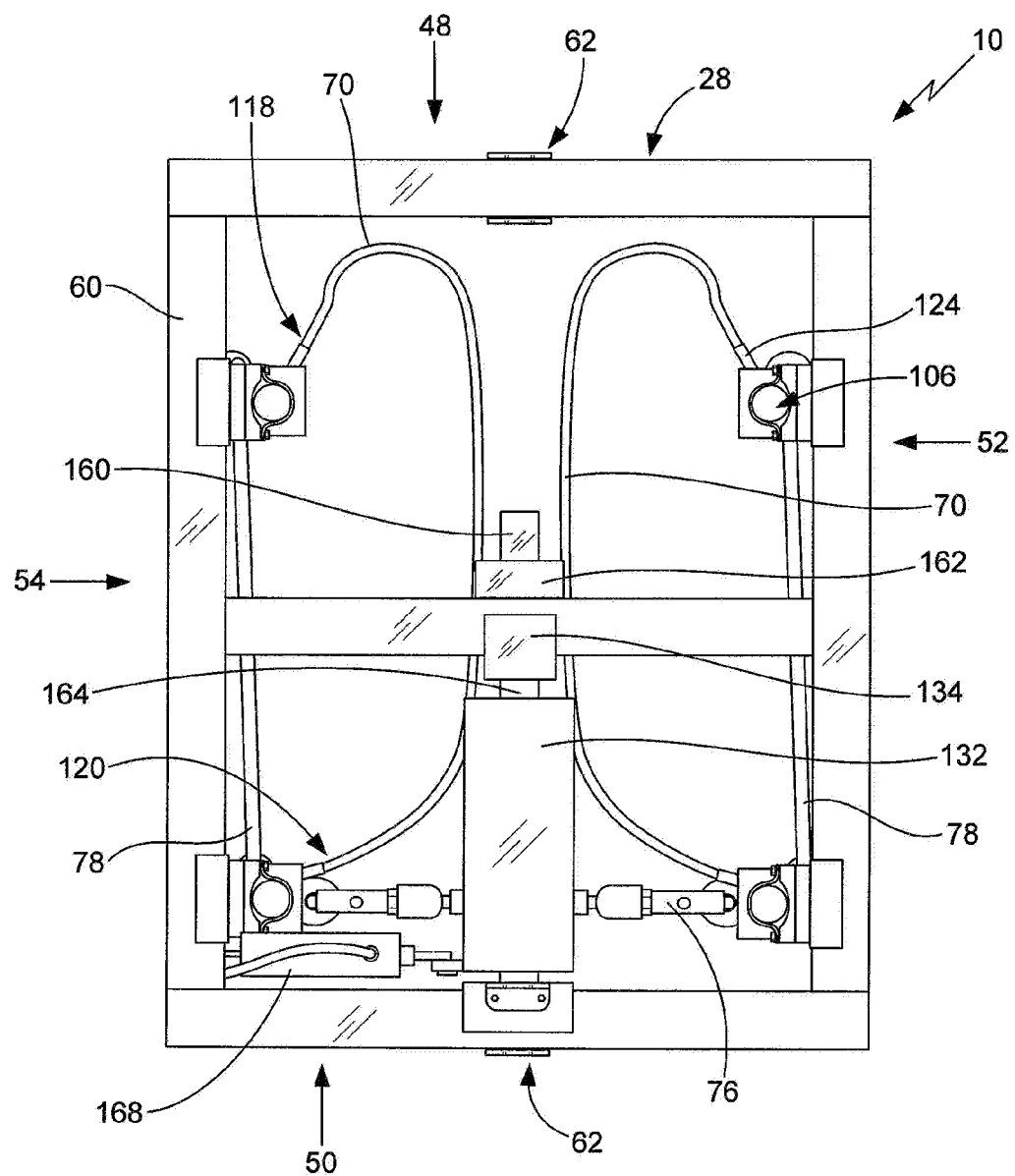
FIG. 10 is a top view of the picking assembly and motion inducing mechanism of the harvesting head of FIG. 3.

In the embodiment of the harvesting head 10 shown in the figures, the forward post members 72 of the sub-structures 68 have a first or upper end 80 and a second or lower end 82, with an outwardly extending upper pin member 84 at the first end 80 and an outwardly extending lower pin member 86 at the second end 82, as best shown in FIG. 8. As described in more detail below, the upper 84 and lower 86 pin members are utilized to pivotally connect the forward post members 72 to one or more frame members 60 of the support frame 28 of the harvesting head 10. The pin members 84/86 are mounted on a pin mounting plate 88 that attaches the pin members 84/86, respectively, to the first end 80 and second end 82, as shown in FIG. 8. Each of the forward post members 74 also has a post connector 90, as best shown in FIGS. 4 and 8, that is utilized with the second connecting member 78 to interconnect the forward 72 and rearward 74 post members, as best shown in FIG. 10, so the two post members 72/74 will move together to oscillate the rods 70 in the canopy 22, when acted upon by the motion inducing mechanism 34, of the tree, vine or other plant 16 to separate the crop 14 therefrom so the crop 14 may be harvested.

Figure 9:
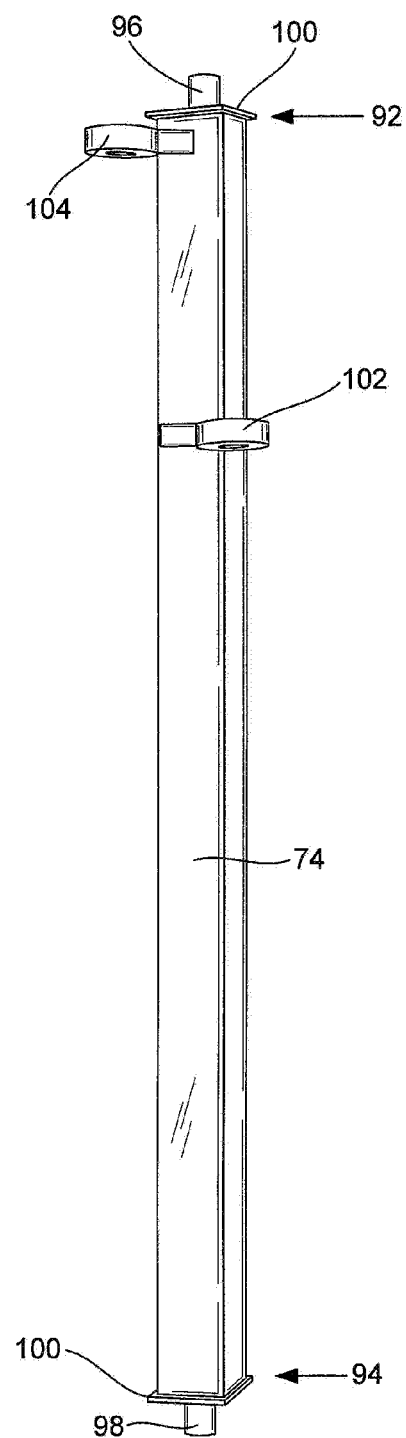
FIG. 9 is a side perspective view of one of the rearward support posts of FIG. 4.

In the embodiment of the harvesting head 10 shown in the figures, the rearward post members 74 of the sub-structures 68 have a first or upper end 92 and a second or lower end 94, with an outwardly extending upper pin member 96 at the first end 92 and an outwardly extending lower pin member 98 at the second end 94, as best shown in FIG. 9. As described in more detail below, the upper 96 and lower 98 pin members are utilized to pivotally connect the rearward post members 74 to one or more frame members 60 of support frame 28 of harvesting head 10. The pin members 96/98 are mounted on a pin mounting plate 100 that attaches the pin members 96/98, respectively, to the first end 92 and second end 94, as shown in FIG. 9. Each of the rearward post members 72 also has a post connector 102 and a mechanism connector 104, as best shown in FIG. 9. As described in more detail below, the first connecting member 76 connects to the mechanism connector 104 in order to interconnect the motion inducing mechanism 34 with the substructure 68 and the second connecting member 78 connects to the post connector 102 to interconnect the rearward post member 74 to the forward post member 72, as best shown in FIG. 10, so the two post members 72/74 will move together to oscillate the rods 70 in the canopy 22 of the tree, vine or other plant 16 to separate the crop 14 therefrom. In the preferred embodiment, the two post connectors 90 and 104 are at substantially the same level such that the two second connecting members 78 are substantially horizontally disposed along the sides 52/54 of the harvesting head 10, as shown FIG. 10. Likewise, in a preferred embodiment, the first connecting member 76 is substantially horizontally disposed between the motion inducing mechanism 34 and the mechanism connector 104 so as to transmit the motion produced by the motion inducing mechanism 34 to the sub-structures 68 to achieve the desired oscillation of the rods 70.

Each of the post members 72/74 are preferably made out of steel or other metal that is sized and configured to safely support the rods 70 and withstand the forces resulting from the oscillation of the rods 70 and any contact, which is preferably incidental, against the tree, vine or other plant 16. In a preferred configuration, the post members 72/74 are painted, coated or otherwise treated to reduce the likelihood of corrosion, as may be appropriate for the materials utilized for the post members 72/74.

Figure 7:
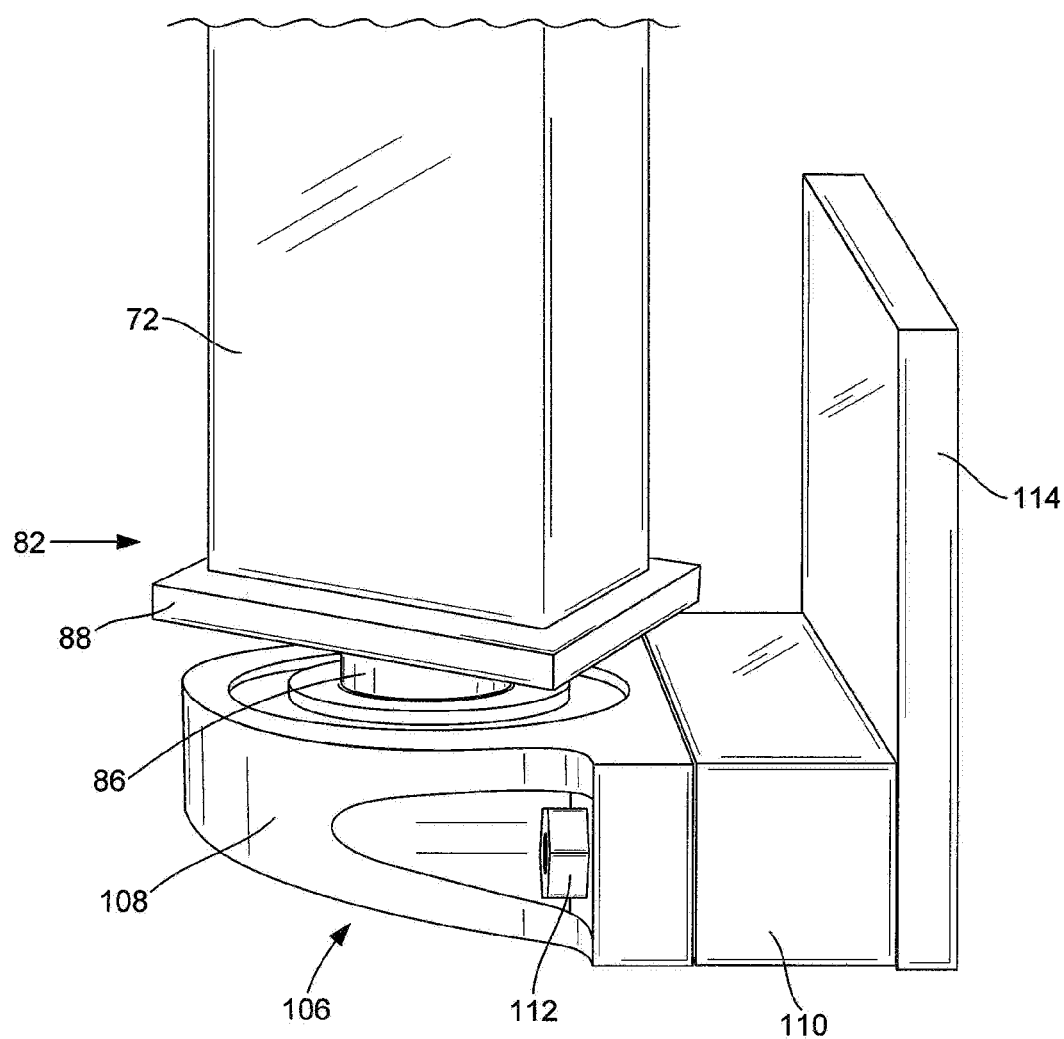
FIG. 7 is a isolated partial front view of one of the support posts of FIG. 4 engaging its associated post mount.

As stated above, both the forward post member 72 and rearward post member 74 of each of the sub-structures 68 are pivotally connected to one or more frame members 60 of the main support frame 28. In the embodiment shown in the figures, a pin and bearing configuration is utilized as a pivoting mechanism 106 that is structured and arranged to allow the post members 72/74 to pivot relative to the support frame 28. As best shown in FIG. 7 with regard to the second/lower end 82 of one of the forward post members 72, the pivoting mechanism 106 utilized with the harvesting head 10 of the embodiment shown in the figures comprises the lower pin member 86 pivotally received in support bearing 108. The pin/bearing connection shown in FIG. 7 is also applicable to the upper pin member 84 at the first/upper end 80 of the forward post member 72 and the upper pin member 96 at the first/upper end 92 of the rearward post member 74 and the lower pin member 98 at the second/lower end 94 of the rearward post member 74, as shown in FIGS. 1-4. The support bearing 108 is structured and arranged to pivotally support the associated post member 72/74 and to be secured to the applicable frame member 60 of the support frame 228. In the embodiment of the harvesting head 10 shown in the figures, the bearing 108 is attached to a spacer block 110 with a connecting element 112, such as the bolt shown in FIG. 7, and the spacer block 110 is fixedly attached to or integral with a mounting plate 114 that is welded to the associated frame member 60. As will be readily appreciated by persons skilled in the art, a variety of different configurations of pivoting mechanism 106 can be utilized with the harvesting head 10 of the present invention. For instance, the relative positions of the pins 88/90/96/98 and the bearing 108 can be switched and the support bearing 108 can attach to the frame member(s) 60 in a wide variety of different ways, including not using the spacer block 110 and/or connecting with the use of bolts, screws, rivets or other connecting elements.

The rods 70 utilized in the picking assembly 32 of the harvesting head 10 of the present invention have a generally curvilinear shape, as best shown in FIGS. 10 and 11. Each of the rods 70 are sized and configured to extend between the forward post member 72 and rearward post member 74 and to connect thereto so as to form the sub-structure 68 and engage the canopy 22 of the plant 16 when in use to harvest crop 14 from the plant 16. Generally, other harvesting machines or heads which utilize rods mount a proximal end of the rod to some type of structure and have the distal end of the rod extending outward therefrom to engage the plant canopy and separate the crop therefrom. The rods 70 of the present invention are not configured in this manner. Instead, as best shown in FIGS. 10 and 11, the rod body 116 has a curvilinear shape and both ends, namely the forward end 118 and the rearward end 120, of the rods 70 are mounted to the forward post member 72 and the rearward post member 74, respectively, utilizing a rod attachment mechanism 122. In one preferred embodiment, rods 70 are made from a fiberglass material that is sufficiently stiff to accomplish the crop removal objectives of the present invention. Rods 70 should extend outward from two post members 72/74 into the canopy 22 when the tree, vine or other plant 16 is in the harvesting area 30 and not excessively whip around inside the canopy 22, which could damage the plant 16, when being oscillated. Other materials can be used for the rods 70, including various metals, composites, polymers or the like that provide sufficient flexibility and are able to withstand the repeated motion provided by the motion inducing mechanism 34, as well as any contact against the canopy 22 or trunk 24 of the plant 16. In the preferred embodiment, the rods 70 are removably attached to the rod attachment mechanism 122 so the user may replace any worn or broken rods 70 as may be needed. In one embodiment, the rods 70 have a generally round cross-section with a diameter of approximately one inch and they extend inward into the harvesting area 30 approximately twelve to twenty inches. In other embodiments of harvesting head 10, particularly depending on the type of tree, vine or other plant 16 from which crop 14 is being harvested and the material from which rods 706 are manufactured, the rods 70 can be of greater or less diameter and extend further or less into the harvesting area 30 to achieve the desired motion of rods 70 and insertion into the canopy 22. Rods 70 may be uniformly shaped along their length with flat or rounded ends 118/120.

A variety of different types of rod attachment mechanism 122 can be utilized to attach the ends 118/120 of the rods 70 to their respective post members 72/74. In the embodiment shown in the figures, the rod attachment mechanism 122 comprises a socket member 124, in which an end 118/120 of the rod 70 is removably received and secured thereto, that is secured to the post member 72/74, as best shown in FIG. 12. The socket member 124 is fixedly secured to a socket mounting plate 126 that is secured to the respective post member 72/74 with a generally u-shaped bolt member 128 and connecting element 130, such as the nut shown in FIG. 12. The u-shaped bolt member 128 is sized and configured to secure the rod attachment mechanism 122 to the respective post member 72/74 in a manner that positions the various socket members 124 to receive the respective ends 118/120 of rods 70 therein. In a preferred embodiment, the rod attachment mechanism 122 is removably and adjustably attached to each of the post members 72/74 so rods 70 may be added, removed or repositioned in the sub-structures 68 as may be desired or necessary depending on crop 14 and/or plant 16. Although it generally provides less flexibility with regard to harvesting different plants 16, those skilled in the art will readily appreciate that the rod attachment mechanism 122 may be fixedly attached to the respective post members 72/74 and/or the ends 118/120 of the rods 70 may be fixedly attached into the socket members 124 of the rod attachment mechanism 122 or attach to another component of a differently configured rod attachment mechanism 122.

As stated above, the purpose of motion inducing mechanism 34 is to transmit a short duration oscillation force to the flexibly mounted rods 70 to cause them to sufficiently oscillate inside the canopy 22 and substantially separate all of the fruit or other crop 14 from the tree, vine or plant 16. In the embodiment set forth in the drawings, as best shown in FIG. 10, the motion inducing mechanism 34 is supported by the main support frame 28 and attached to the rearward post member 74, by the first connecting member 76. The forward post member 72 is attached to the rearward post member 74 by the second connecting member 78, as also best shown in FIG. 10. The motion inducing mechanism 34 is configured to impart a rapid, forward and backward whipping motion, by way of the forward 76 and rearward 78 post members, to the rods 70 that produces a tree shaking-like motion that is much closer to the crop 14 than traditional tree shaking machines, thereby providing a more intense whipping motion in the canopy 22 than would be possible if only shaking the trunk 24 of the tree 16. Through various trial and error experiments, the inventor has found that a generally snap-like, rapid whipping motion, which is transmitted to the rods 70 through post members 72/74, provided by motion inducing mechanism 34 best achieves the desired removal of the fruit or other crop 14 from the tree, vine or other plant 16.

Figure 13:
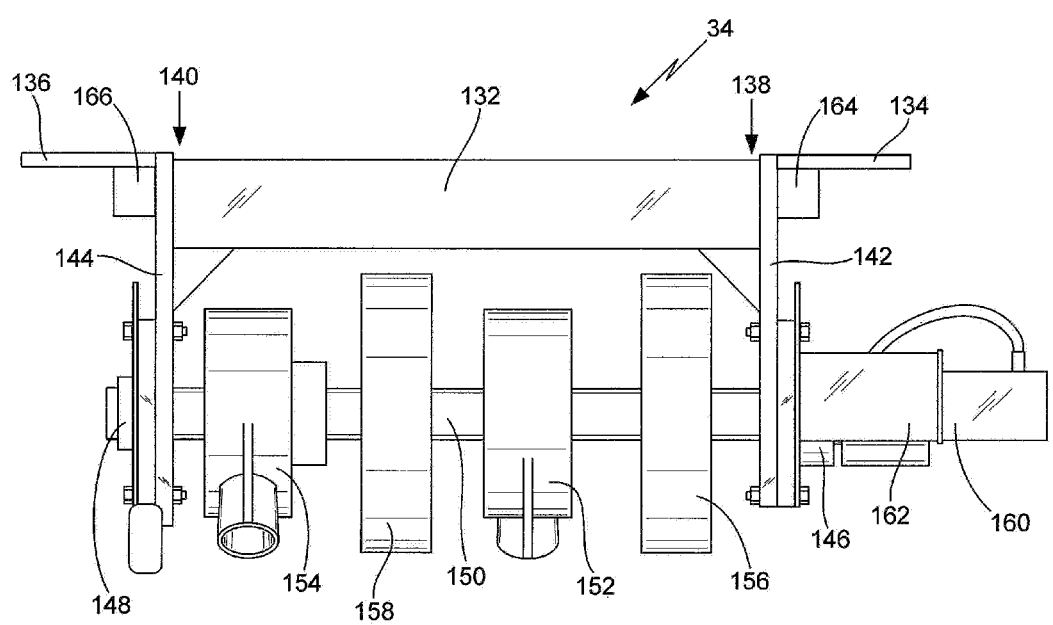
FIG. 13 is a side view of the motion inducing mechanism of FIG. 10.

As best shown in FIGS. 10 and 13, the motion inducing mechanism 34 of the present invention comprises a mounting block 132 that is mounted to spaced apart frame members 60 of main support frame 28 of the harvesting head 10 by a pair of block mounting plates, namely a forward block mounting plate 134 and a rearward block mounting plate 136, at or near the forward end 138 and the rearward end 140, respectively of the mounting block 132. Secured to each end 138/140 of the mounting block 132 and the mounting plates 134/136 is a bearing plate, namely a forward bearing plate 142 and a rearward mounting plate 144, to which is mounted a forward bearing 146 and a rearward bearing 148, respectively, as best shown in FIG. 13. Rotatably disposed between the two bearings 146/148 is an elongated shaft 150. Mounted on the shaft 150 is a pair of offset center bearings, shown as forward offset center bearing 152 and rearward offset center bearing 154, and one or more weight members, such as the pair of weight members shown as forward weight member 156 and rearward weight member 158. One end of each of the first connecting members 76 is connected to one of the offset center bearings 152/154 and the opposite end of the first connecting members 76 is attached to the mechanism connectors 104 of one of the rearward post members 74, which is connected to the forward post member 72 by the second connecting member 78, such that when the offset center bearings 152/154 pivot, as described below, the entire picking assembly 32 will pivot relative to the main support frame 28 and the rods 70 will engage the canopy 22 of the tree, vine or plant 16 to separate the crop 14 from the plant 16. As further shown in FIG. 13, the motion inducing mechanism 34 comprises a motor 160 that is operatively attached to a motor coupling 162 which is connected to the forward end of the shaft 150 to rotatably drive the shaft 150 and rotate the offset center bearings 152/154 and weight members 156/158. Positioned at each end 138/140 of the mounting block 132 is a block bearing, namely a forward block bearing 164 and a rearward block bearing 166, that allow the mounting block 132 (and the various components of the motion inducing mechanism 34 attached thereto) to pivot relative to the mounting plates 134/136 and the frame members 60 to which the mounting plates 134/136 are mounted. As will be readily appreciated by persons who are skilled in the art, this pivoting motion is transferred to the picking assembly 32 so the rods 70 will rapidly move forward and backward and left and right inside the canopy 22 and separate the crop 14 from the plant 16. In a preferred embodiment, the mounting plates 134/136 are fixedly mounted to the frame members 60, typically by welding. Alternatively, the bolts, screws, rivets or other appropriately configured connectors may be utilized to detachably mount the motion inducing mechanism 34 to the frame members 60. A shock absorbing device 168, best shown in FIGS. 3 and 10, interconnects the motion inducing mechanism 34 and the main support frame 28 of the harvesting head 10 to reduce the forces imparted by the motion inducing mechanism 34 on harvesting head 10.

In the embodiment shown in the figures, the motor 160 is a hydraulic motor that is connected to a pressurized hydraulic system via one or more hoses. Alternatively, the motor 160 may be an electric, gasoline, diesel or other type of motor, the use and operation of which, including the hydraulic motor, are well known in the art. When the motor 160 is operated, the shaft 150 rotates to rotate the offset center bearings 152/154 and the weights 156/158, which causes the mounting block 132 to repeatedly pivot, at block bearings 164/168, relative to the block mounting plates 134/136 and the frame members 60 to which the block mounting plates 134/136 are mounted. Because the first connecting members 76 are connected to the mechanism connectors 104 of the rearward post members 74, which in turn are connected to the forward post members 73 by the second connecting member 78, the pivoting of the mounting block 132 and the other components of the motion inducing mechanism 34 will sharply and rapidly pivot the picking assembly 32. The configuration of the motion inducing mechanism 34 and sub-structures 68 to which it is attached provides a snap-like effect for the rods 70 that will engage the canopy 22 to separate the fruit or other crop 14 from the tree, vine or other plant 14 so the crop may be easily and quickly harvested.

Figure 14:
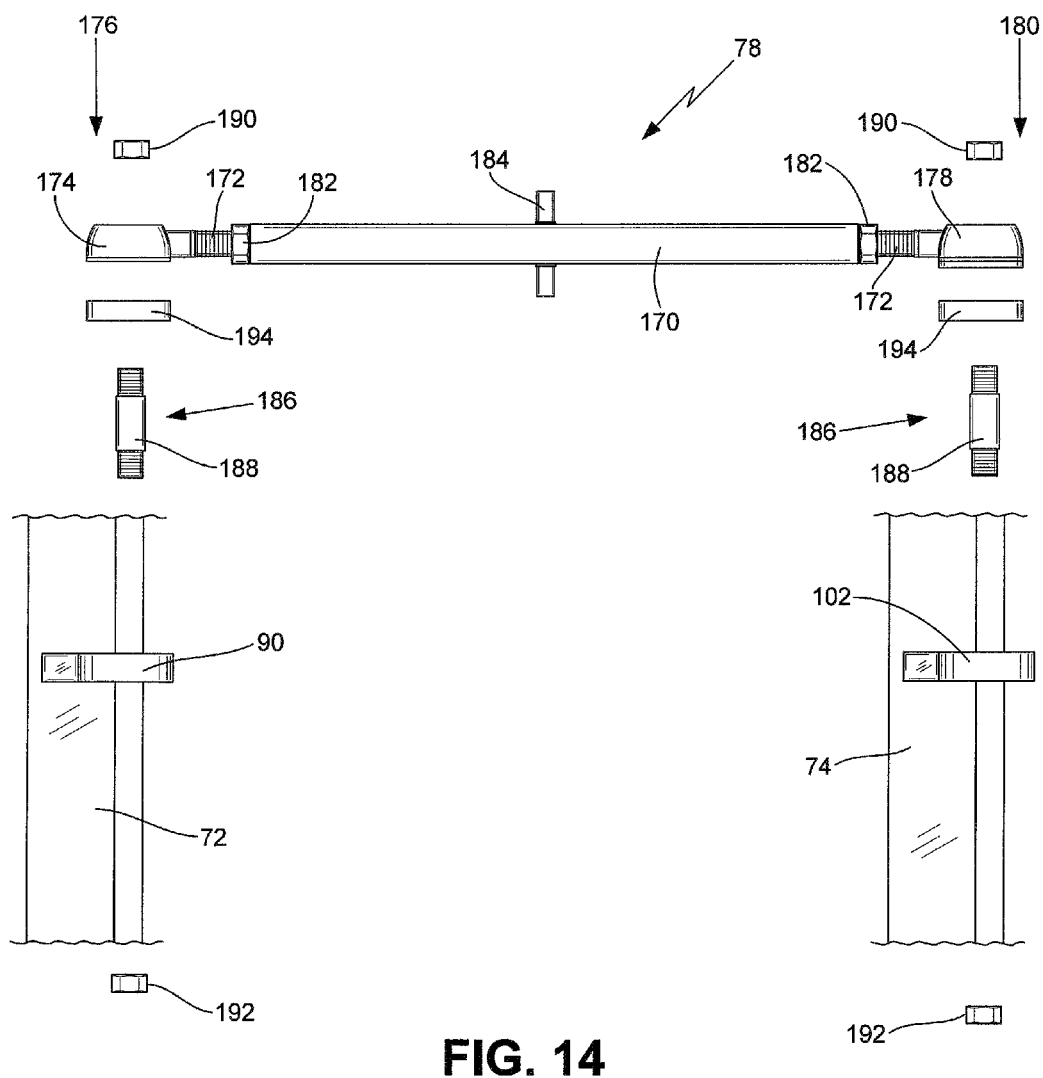
FIG. 14 is an exploded side view of the second connecting member and rod connecting mechanism shown positioned at a forward post member and a rearward post member of the picking assembly shown in FIG. 10

The second connecting member 78 for one side 52/54 of harvesting head 10 and its connections to the two post connectors 90/102 of the forward post member 72 and rearward post member 74, respectively, are shown in FIG. 14. As shown in this figure, the second connecting member 78 comprises an elongated rod member 170 having threaded ends 172, to which is connected a first rod connector 174 at the forward end 176 of the second connecting member 78 and a second rod connector 178 at the opposite directed or rearward end 180 of the second connecting member 78. In one embodiment, the first 174 and second 178 rod connectors are configured substantially the same or somewhat similar to the post connectors 90/102 and the mechanism connector 104 utilized with the post members 72/74. At the ends of the elongated rod member 170 are adjustable connectors 182 (such as the nuts shown in FIG. 14) that allow the user to adjust the movement of the rods 70 by adjusting the relative position of the second connecting member 78 to the two post members 72/74. To assist the user with adjusting the second connecting member 78, a handle 184 is attached to or is integral with the rod member 170. A pair of rod connecting mechanisms 186 are utilized to connect the first rod connector 174 to post connector 90 of the forward post member 72 and the second rod connector 178 to post connector 102 of the rearward post member 74, as shown in FIG. 14. In this embodiment, the rod connecting mechanism 186 comprises a pin member 188 having threaded ends, two which are threadably engaged first connecting elements (nuts) 190 at rod connectors 174/178 and second connecting elements (also nuts) 192 at the post connectors 90/102. A bearing element 194 is positioned between the rod connectors 174/178 and the pin members 188, as shown in FIG. 14, to allow the two rod connectors 174/178 to pivot relative to pin members 188. In this manner, the second connecting member 78 can transfer the force from the rearward post member 74, which is exerted on it by the motion inducing mechanism 34, to the forward post member 72. The same or a similar connecting mechanism to the rod connecting mechanism 186 is utilized for the first connecting member 76 to connect the motion inducing mechanism 34 to the mechanism connector 104 of the rearward post member 74.

In use, the harvesting head 10 is securely attached to one or more frame members 38 of the frame 36 of a mechanical harvesting machine 12, using the connecting mechanism 62, or the harvesting head 10 is manufactured with or integral to the mechanical harvesting machine 12. The mechanical harvesting machine 12 is driven, pulled or otherwise moved through the orchard, vineyard, field or other growing area 20 to engage the trees, vines or other plants 16 that are disposed in rows 26, as shown in FIG. 16, and is positioned so the canopy 22 of the plant 16 is in the harvesting area 30 of the harvesting head 10, as shown in FIG. 1. For trees and like plants 14, the harvesting machine 12 is moved from one tree to another before engaging the motion inducing mechanism 34. For vines and like plants 14, the harvesting machine 12 is moved along the row 26 of vines with the motion inducing mechanism 34 running mostly continuously as the harvesting machine 12 moves. With the motion inducing mechanism 34 operating, the motor 160 will cause the mounting block 132 to pivot, which will pivot the offset center bearings 152/154 and move the first connecting members 76 in a generally forward and backward motion. This motion is transferred to the sub-structures 68 through the connection of the first connecting members 76 with the mechanism connector 104 on the rearward post member 74, which then transfers the motion to the forward post member 74 by way of the second connecting member 78 to allow the post members 72/74 to pivot relative to the main support frame 28. The pivoting motion moves the rods 70 that are attached to and interconnect the forward 72 and rearward 74 post members, as shown in FIG. 10. The moving rods 70 will engage the canopy 22 of the plant 16. The rapid, sharp forward and rearward motion of the rods 70 will separate all or substantially all of the fruit or other crop 14 from the plant 16. The dislodged crop 14 will fall onto the conveying assembly 42 and then, preferably, be transported by the conveying assembly 42 to one or more bins 44 that are either associated with harvesting machine 12 or which are being moved substantially along with the harvesting machine 12, such as shown in FIG. 16 with the second tractor 46 pulling the bin 44.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A harvesting head for use with a harvesting machine having a plurality of machine frame members that define an open machine frame and a plurality of wheels that are rotatably attached to a chassis so said harvesting machine may be pulled by a towing machine through a growing area to separate a crop from a canopy of a plant in a row of plants, said harvesting head comprising:

a main support frame sized and configured to be removably attached to and moveably supported by one or more of said machine frame members of said machine frame of said harvesting machine so as to be disposed inside said machine frame of said harvesting machine and to move therewith by being carried inside said machine frame, said main support frame having a plurality of frame members that are structured and arranged to substantially straddle the plant as said harvesting machine moves along the row of plants with said main support frame of said harvesting head being substantially disposed inside said machine frame members of said machine frame so said harvesting head will straddle the plant while being carried by said machine frame of said harvesting machine through the growing area, said main support frame having a front end, a back end, a top side, a bottom side and a pair of opposing sides defining a harvesting area therebetween, said harvesting area being sized and configured to receive the canopy of the plant therein when said main support frame is positioned so as to straddle the plant;

a motion inducing mechanism support by said main support frame, said motion inducing mechanism comprising a mounting block supporting a shaft on one or more bearings and a motor operatively connected to said shaft, said motion inducing mechanism further comprising one or more offset center bearings and one or more weight members on said shaft, said motion inducing mechanism structured and arranged to sharply and rapidly induce alternating forwardly and rearwardly directed motion; and a picking assembly pivotally supported by said main support frame, said picking assembly structured and arranged to engage the canopy of the plant when the plant is in said harvesting area so as to separate the crop from the plant, said picking assembly comprising a pair of sub-structures disposed on each of said opposing sides of said main support frame and positioned so as to be at least partially disposed in said harvesting area, each of said sub-structures having a forward post member disposed towards said front end of said main support frame and pivotally connected thereto, a rearward post member disposed towards said back end of said main support frame and pivotally connected thereto, a plurality of curvilinear rods interconnecting said forward post member and said rearward post member and a first connecting member interconnecting said motion inducing mechanism with at least one of said forward post member and said rearward post member so as to pivot each of said sub-structures in response to the alternating forwardly and rearwardly directed motion and oscillate each of said plurality of rods in a forward and rearward direction, each of said plurality of rods sized and configured with a rod body that extends into said harvesting area to engage the canopy of the plant when the plant is in said harvesting area.

2. The harvesting head of claim 1 further comprising a second connecting member that is sized and configured to interconnect said forward post member and said rearward post member and pivot said forward post member and said rearward post member substantially together.

3. The harvesting head of claim 2 further comprising a post connector on each of said forward post member and said rearward post member, said post connectors cooperatively configured with said second connecting member so as to attach thereto and interconnect said forward post member and said rearward post member.

4. The harvesting head of claim 3, wherein said second connecting member comprises an elongated rod member having a first rod connector at a forward end of said second connecting member, a second rod connector at a rearward end thereof and a pin member associated with each of said first rod connector and said second rod connector and configured to connect said post connector on said forward post member to said first rod connector and connect said post connector on said rearward post member to said second rod connector.

5. The harvesting head of claim 1, wherein each of said forward post member and said rearward post member of each of said sub-structures has an upper end and a lower end, each of said upper end and said lower end of each of said forward post member and said rearward post member having a pin member that is operatively connected to a pivoting mechanism which is attached to one of said frame members of said main support frame, said pivoting mechanism being structured and arranged to pivot said forward post member or said rearward post member relative to a frame member of said main support frame.

6. The harvesting head of claim 5, wherein said pivoting mechanism comprises a support bearing configured to allow said pin member to pivot therein and a mounting plate configured to mount said pivoting mechanism to said one of said frame members.

7. The harvesting head of claim 1 further comprising a connecting mechanism attached to at least one of said frame members of said main support frame so as to connect said harvesting head to one or more frame members of said machine frame of said harvesting machine.

8. The harvesting head of claim 7, wherein said connecting mechanism comprises one or more connecting plates.

9. The harvesting head of claim 1, wherein each of said rod bodies have a forward end and a rearward end and said picking assembly further comprises a rod attachment mechanism associated with each of said forward post member and said rearward post member so as to secure said forward end of said rod body to said forward post member and said rearward end of said rod body to said rearward post member.

10. The harvesting head of claim 9, wherein said rod attachment mechanism comprises a socket member and a u-shaped bolt member, said socket member sized and configured to receive one of said forward end and said rearward end of said rod body, said u-shaped bolt member sized and configured to mount said socket member to one of said forward post members and said rearward post members so as to direct said rod into said harvesting area.

11. The harvesting head of claim 1, wherein said first connecting member connects one of said one or more offset center bearings of said motion inducing mechanism with said rearward post member.

12. A harvesting head for use with a harvesting machine having a plurality of machine frame members that define an open machine frame and a plurality of wheels that are rotatably attached to a chassis so said harvesting machine may be pulled by a towing machine through a growing area to separate a crop from a canopy of a plant in a row of plants, said harvesting head comprising:

a main support frame configured to be removably attached to and moveably supported by one or more of said machine frame members of said machine frame of said harvesting machine so as to be at least generally disposed inside said machine frame of said harvesting machine and to move therewith by being carried within said machine frame, said main support frame having a plurality of frame members that are structured and arranged to substantially straddle the plant as said harvesting machine moves along the row of plants with said main support frame of said harvesting head being substantially disposed inside said machine frame members of said machine frame so said harvesting head will straddle the plant while being carried by said machine frame of said harvesting machine through the growing area, said main support frame having a front end, a back end, a top side, a bottom side and a pair of opposing sides defining a harvesting area therebetween, said harvesting area being sized and configured to receive the canopy of the plant therein when said main support frame is positioned so as to straddle the plant;

a motion inducing mechanism support by said main support frame, said motion inducing mechanism comprising a mounting block supporting a shaft on one or more bearings and a motor operatively connected to said shaft, said motion inducing mechanism further comprising one or more offset center bearings and one or more weight members on said shaft, said motion inducing mechanism structured and arranged to sharply and rapidly induce alternating forwardly and rearwardly directed motion; and a picking assembly pivotally supported by said main support frame, said picking assembly structured and arranged to engage the canopy of the plant when the plant is in said harvesting area so as to separate the crop from the plant, said picking assembly comprising a pair of sub-structures disposed on each of said opposing sides of said main support frame and positioned so as to be at least partially disposed in said harvesting area, each of said sub-structures having a forward post member disposed towards said front end of said main support frame and pivotally connected thereto, a rearward post member disposed towards said back end of said main support frame and pivotally connected thereto, a plurality of curvilinear rods interconnecting said forward post member and said rearward post member, a first connecting member connecting one of said one or more offset center bearings of said motion inducing mechanism with said rearward post member so as to pivot each of said sub-structures in response to the alternating forwardly and rearwardly directed motion and oscillate each of said plurality of rods in a forward and rearward direction and a second connecting member sized and configured to interconnect said forward post member and said rearward post member so as to pivot said forward post member and said rearward post member substantially together, each of said plurality of rods sized and configured with a rod body that extends into said harvesting area to engage the canopy of the plant when the plant is in said harvesting area.

13. The harvesting head of claim 12 further comprising a post connector on each of said forward post member and said rearward post member, said post connectors cooperatively configured with said second connecting member so as to attach thereto and interconnect said forward post member and said rearward post member.

14. The harvesting head of claim 12, wherein each of said forward post member and said rearward post member of each of said sub-structures has an upper end and a lower end, each of said upper end and said lower end of each of said forward post member and said rearward post member having a pin member that is operatively connected to a pivoting mechanism which is attached to one of said frame members of said main support frame, said pivoting mechanism being structured and arranged to pivot said forward post member or said rearward post member relative to a frame member of said main support frame.

15. The harvesting head of claim 12 further comprising a connecting mechanism attached to at least one of said frame members of said main support frame so as to connect said harvesting head to one or more frame members of a frame of said harvesting machine, said connecting mechanism comprising one or more connecting plates.

16. The harvesting head of claim 12, wherein each of said rod bodies have a forward end and a rearward end and said picking assembly further comprises a rod attachment mechanism associated with each of said forward post member and said rearward post member so as to secure said forward end of said rod body to said forward post member and said rearward end of said rod body to said rearward post member.

17. A harvesting machine for separating a crop from a canopy of a plant in a row of the plants, said harvesting machine comprising:
an open machine frame having one or more machine frame members and a chassis;
one or more wheels rotatably connected to said chassis, said one or more wheels configured to allow said harvesting machine to move through a growing area having the row of the plants;
a harvesting head comprising a main support frame supported by one or more of said machine frame members of said machine frame of said harvesting machine so as to be at least generally disposed within said machine frame of said harvesting machine and to move therewith by being carried within said machine frame, a motion inducing mechanism supported by said main support frame and a picking assembly pivotally supported by said main support frame, said main support frame having a plurality of frame members that are structured and arranged to substantially straddle the plant as said harvesting machine moves along the row of plants with said main support frame of said harvesting head being substantially disposed inside said machine frame members of said machine frame so said harvesting head will straddle the plant while being carried by said machine frame of said harvesting machine through the growing area, said main support frame having a front end, a back end, a top side, a bottom side and a pair of opposing sides defining a harvesting area therebetween, said harvesting area being sized and configured to receive the canopy of the plant therein when said main support frame is positioned so as to straddle the plant, said motion inducing mechanism comprising a mounting block supporting a shaft on one or more bearings and a motor operatively connected to said shaft, said motion inducing mechanism further comprising one or more offset center bearings and one or more weight members on said shaft, said motion inducing mechanism structured and arranged to sharply and rapidly induce alternating forwardly and rearwardly directed motion, said picking assembly structured and arranged to engage the canopy of the plant when the plant is in said harvesting area so as to separate the crop from the plant, said picking assembly comprising a pair of sub-structures disposed on each of said opposing sides of said main support frame and positioned so as to be at least partially disposed in said harvesting area, each of said sub-structures having a forward post member disposed towards said front end of said main support frame and pivotally connected thereto, a rearward post member disposed towards said back end of said main support frame and pivotally connected thereto, a plurality of curvilinear rods interconnecting said forward post member and said rearward post member and a first connecting member interconnecting said motion inducing mechanism with at least one of said forward post member and said rearward post member so as to pivot each of said sub-structures in response to the alternating forwardly and rearwardly directed motion and oscillate each of said plurality of rods in a forward and rearward direction, each of said plurality of rods sized and configured with a rod body that extends into said harvesting area to engage the canopy of the plant when the plant is in said harvesting area; and
a conveying assembly structured and arranged to receive and convey the crop dislodged from the plant by said picking assembly.

18. The harvesting machine of claim 17, wherein said harvesting head further comprises a post connector on each of said forward post member and said rearward post member, said post connectors cooperatively configured with said second connecting member so as to attach thereto and interconnect said forward post member and said rearward post member.

19. The harvesting machine of claim 17, wherein each of said forward post member and said rearward post member of each of said sub-structures of said harvesting head has an upper end and a lower end, each of said upper end and said lower end of each of said forward post member and said rearward post member having a pin member that is operatively connected to a pivoting mechanism which is attached to one of said frame members of said main support frame, said pivoting mechanism being structured and arranged to pivot said forward post member or said rearward post member relative to a frame member of said main support frame.

20. The harvesting machine of claim 17, wherein said harvesting head further comprises a connecting mechanism attached to at least one of said frame members of said main support frame so as to connect said harvesting head to one or more frame members of a frame of said harvesting machine, said connecting mechanism comprising one or more connecting plates.

* * * * *